H. UHLRIG.
STEERING MECHANISM FOR TRACTORS.
APPLICATION FILED JAN. 26, 1914.
1,162,418.
Patented Nov. 30, 1915.
2 SHEETS—SHEET 2.
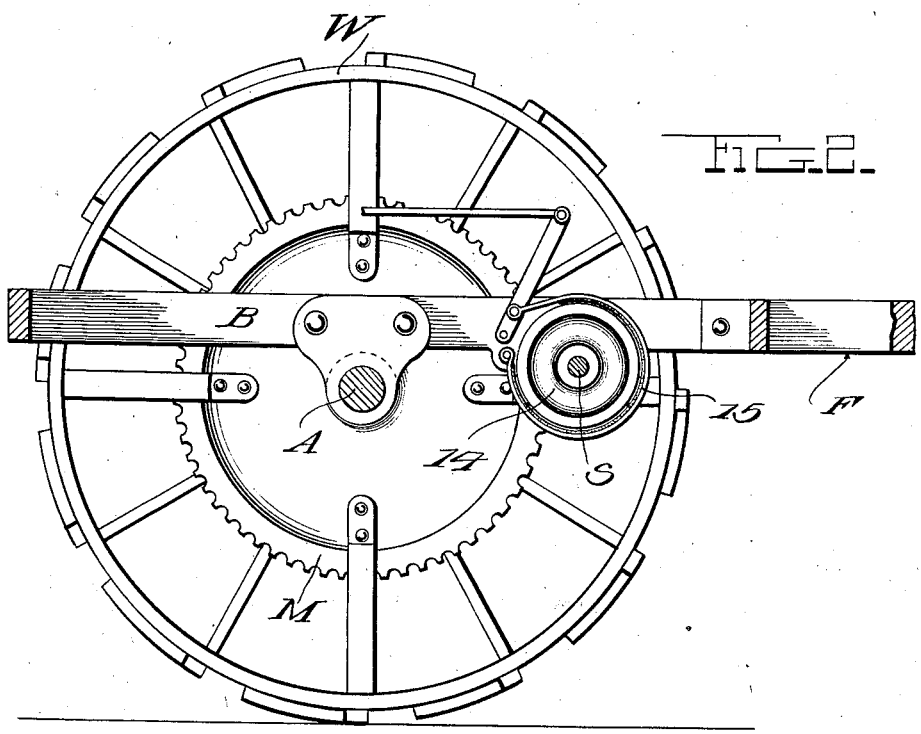
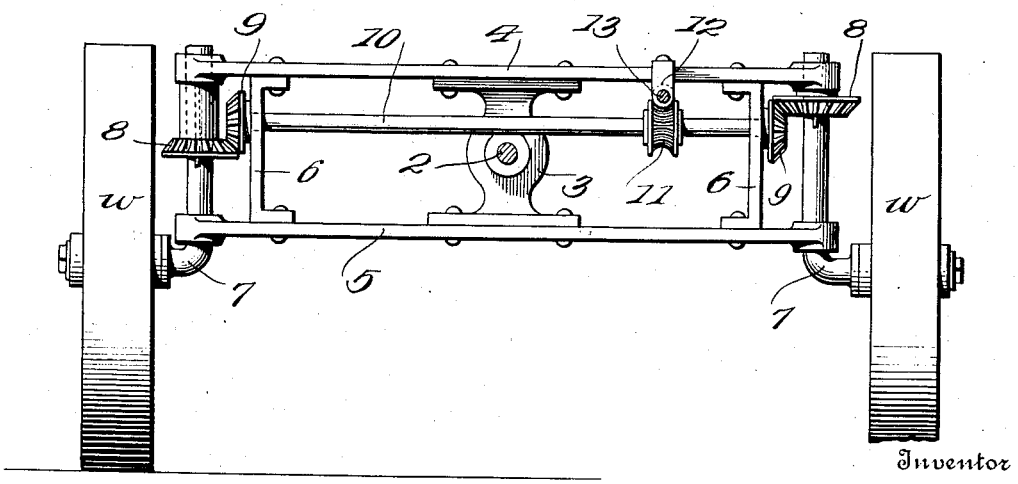
Witnesses
Inventor
Herman Uhlrig
By H. B. Wilson & Co.
Attorneys

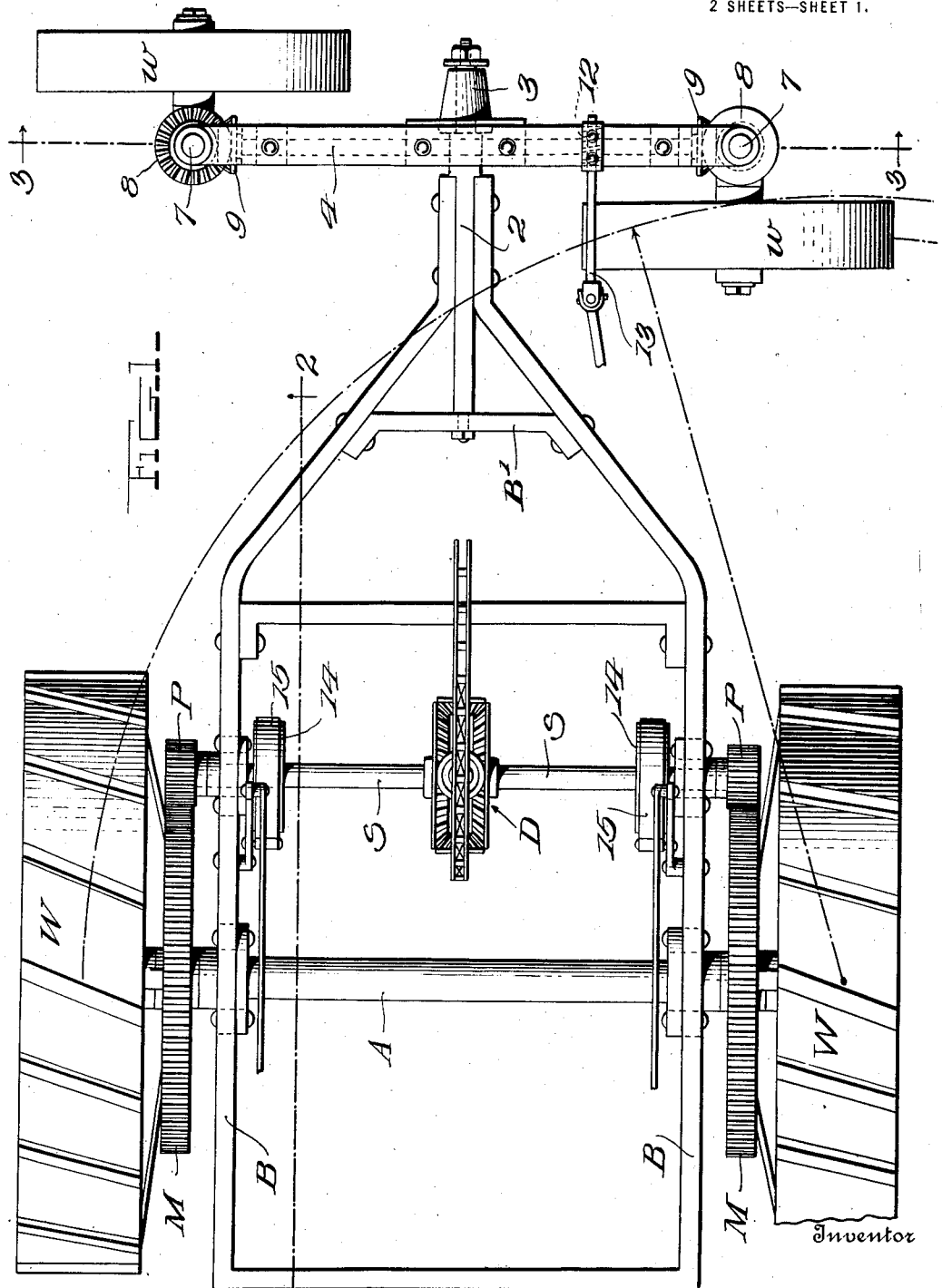

UNITED STATES PATENT OFFICE.

HERMAN UHLRIG, OF WAMEGO, KANSAS.

STEERING MECHANISM FOR TRACTORS.

1,162,418.  Specification of Letters Patent.  Patented Nov. 30, 1915.

Application filed January 26, 1914. Serial No. 814,426.

*To all whom it may concern:*

Be it known that I, HERMAN UHLRIG, a citizen of the United States, residing at Wamego, in the county of Pottawatomie and State of Kansas, have invented certain new and useful Improvements in Steering Mechanism for Tractors; and I do declare the following to be a full, clear, and exact description of the invention, such as will enable others skilled in the art to which it appertains to make and use the same.

This invention relates to improvements in tractors, and more particularly to steering devices therefor.

The primary object of the invention is to provide a simply constructed steering mechanism which may be quickly and easily applied to tractors of various types and which will enable the entire machine to be turned upon one of its rear drive wheels as a pivot.

I am aware that certain other devices have been invented for this purpose, but the majority of them are utterly impractical, since they employ no differential shaft whatever, various make-shifts being employed for accomplishing the work of the ordinary differential now in use on practically every motor vehicle and tractor.

A secondary object therefore, is to utilize the differential shaft to perform the work of swinging the entire tractor around.

With the above objects in view, the invention resides in certain novel features of construction and combination herein described and claimed and shown in the drawings wherein:

Figure 1 is a plan view of the frame of a tractor showing my invention applied thereto; Fig. 2 is a vertical longitudinal section on the line 2—2 of Fig. 1; Fig. 3 is a transverse section on the line 3—3 thereof.

In the embodiment illustrated in the accompanying drawings, I have shown a tractor comprising a frame F, the usual supporting axle A, drive wheels W, master gears M rigidly secured to the wheels, pinions P meshing with the gears M and rigidly carried on the opposite ends of the drive shaft S in which is employed the usual form of differential D.

The forward ends of the side bars B forming the frame F, converge and are riveted to a pivot shaft 2 which extends rearwardly and is rigidly secured to a cross bar B'. The shaft 2 projects a suitable distance beyond the forward end of the frame F and journaled on said projecting end is a bearing bracket 3 to the upper and lower ends of which are secured upper and lower transverse bars 4 and 5, said bars being held in spaced relation by means of cross bars 6 secured thereto near their opposite ends.

Mounted for horizontal swinging movement in the outer end of the bars 4 and 5 are L-shaped supporting axles 7 upon the horizontal portions of which are revolubly mounted the front wheels $w$, while bevel gears 8 are rigidly secured to the upright portions thereof said bevel gears meshing with similar bevel gears 9 on a horizontal shaft 10 which is journaled through the transverse bars 6. The shaft 10 is provided with a worm gear 11 with which meshes a worm 12 carried on the end of a flexible steering shaft 13 which extends backwardly and is provided with any suitable operating handle (not shown). By mounting the front wheels $w$ in the above described manner, when the shaft 13 is turned, said wheels will be turned in the proper direction for steering the machine under ordinary circumstances, or, when it is desired to turn completely around, they may be turned until they stand at substantially right angles to the drive wheels W for a purpose to appear.

Rigidly secured on each end of the drive shaft S is a brake drum 14, which is adapted to co-act with a brake band 15, the latter being operated by foot or hand power in the usual manner.

When it is desired to turn the tractor entirely around, the front wheels $w$ are set in the position shown in Fig. 1, and, if it is desired to turn to the right, the right hand brake band 15 is operated to prevent the right hand end of the drive shaft S from rotating. This operation will, through the operation of the differential D, cause the opposite end of the shaft to be driven in the proper direction to propel the left hand drive wheel W forwardly, thus swinging the entire machine upon the right hand drive wheel as a pivot. It will be understood that the operation is necessarily reversed when turning to the left.

By the above described construction, I have provided a very simple and efficient steering mechanism for tractors which will operate to great advantage when making abrupt turns, while various differences in speed of the drive wheels W will be compensated for by the differential D when making slight turns.

It will be understood that the brake drums and brakes could be applied to any tractor having a drive shaft provided with a differential, and that the steering mechanism already installed on said tractor could be employed provided the front wheels $w$ were allowed to turn to the proper extent.

Although I have described my invention with considerable minuteness, I do not wish to be limited to details other than those amplified in the appended claim.

Having thus described my invention, what I claim as new and desire to secure by Letters Patent is:

A device of the class described comprising parallel side bars rigidly secured at their rear ends by a cross bar, a transversely extending axle supported by said side bars and carrying rear supporting wheels, the said side bars converging inwardly adjacent their forward ends, a longitudinally extending pivot shaft secured between the forward ends of the side bars, a transversely extending bar secured between the inwardly converging sections of the side bars and adapted to receive the rear end of the longitudinally extending pivot shaft, a transversely extending rectangular frame having a centrally disposed bearing therein supporting the forward end of the pivot shaft and adapted to oscillate thereon, angular supporting axles having their upright portions journaled in the opposite ends of said frame carrying front supporting wheels, and means to simultaneously turn said wheels whereby they may be positioned transversely of the frame, the converging forward side bars preventing any contact therewith.

In testimony whereof I have hereunto set my hand in presence of two subscribing witnesses.

HERMAN UHLRIG.

Witnesses:
W. A. KNECHT,
C. D. RINEHART.